(12) United States Patent
Chen

(10) Patent No.: US 9,128,344 B2
(45) Date of Patent: Sep. 8, 2015

(54) LED VEHICLE HEADLAMP WITH ELECTROCHROMIC DEVICE

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 52 days.

(21) Appl. No.: 14/067,975

(22) Filed: Oct. 31, 2013

(65) Prior Publication Data

US 2015/0036373 A1 Feb. 5, 2015

(30) Foreign Application Priority Data

Aug. 2, 2013 (TW) .............................. 102127699 A

(51) Int. Cl.
*F21S 8/10* (2006.01)
*G02F 1/153* (2006.01)
*F21Y 101/02* (2006.01)

(52) U.S. Cl.
CPC .............. *G02F 1/153* (2013.01); *F21S 48/1154* (2013.01); *F21S 48/12* (2013.01); *F21S 48/1731* (2013.01); *F21S 48/1258* (2013.01); *F21S 48/1329* (2013.01); *F21Y 2101/02* (2013.01)

(58) Field of Classification Search
CPC ... F21S 48/12; F21S 48/1154; F21S 48/1258; F21S 48/1329; F21S 48/1731; G02F 1/153; F21Y 2101/02

See application file for complete search history.

(56) References Cited

U.S. PATENT DOCUMENTS

| 6,059,435 A * | 5/2000 | Hamm et al. ................. 362/514 |
| 6,491,416 B1 * | 12/2002 | Strazzanti ..................... 362/464 |
| 2003/0202357 A1 * | 10/2003 | Strazzanti ..................... 362/509 |

* cited by examiner

*Primary Examiner* — Thomas M Sember

(74) *Attorney, Agent, or Firm* — Novak Druce Connolly Bove + Quigg LLP

(57) ABSTRACT

An LED vehicle headlamp includes an LED light source, at least one electrochromic device optically coupled to the LED light source, and a collimator positioned between the LED light source and the electrochromic device. The electrochromic device has an alterable light transmission characteristics in response to voltage/current level applied thereto. The collimator is configured for collimating and converging light emitted from the LED light source and directing light into the electrochromic device. When a forward bias voltage/current is applied to the electrochromic device, the visible light transmission of the electrochromic device decreases accordingly to generate a first light intensity distribution pattern, which is a low beam. When a backward bias voltage/current is applied to the electrochromic device, the visible light transmission of the electrochromic increases accordingly to generate a second light intensity distribution pattern (high beam) different from the first light intensity distribution pattern.

20 Claims, 6 Drawing Sheets

LED VEHICLE HEADLAMP WITH ELECTROCHROMIC DEVICE

TECHNICAL FIELD

The present disclosure relates generally to an LED vehicle headlamp, wherein the LED vehicle headlamp has an electrochromic device for achieving an adjustable light intensity distribution so that the LED vehicle headlamp can generate a low beam and a high beam.

DESCRIPTION OF RELATED ART

LEDs are solid state light emitting devices formed of semiconductors, which are more stable and reliable than other conventional light sources such as incandescent bulbs. Thus, LEDs are being widely used in various fields such as numeral/character displaying elements, signal lights, light sources for lighting and display devices.

Nowadays, light emitting diode (LED) light sources are widely applied for illumination, such as being used for vehicle illumination. A traditional vehicle headlamp includes an LED light source, a reflector for reflecting light from the LED light source toward a projection lens, and a light shielding sheet placed between the LED light source and the projection lens for creating a specific irradiation region with a desired bright/dark cut-off line to satisfy certain traffic regulations. However, such a vehicle headlamp generates a constant light output profile in either high beam or low beam, thereby decreasing the adaptability of The LED vehicle headlamp to different countries which have different requirements regarding the illumination profiles of the low and high beams emitted from the headlamp.

What is needed therefore is an improved vehicle headlamp which can overcome the above mentioned limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
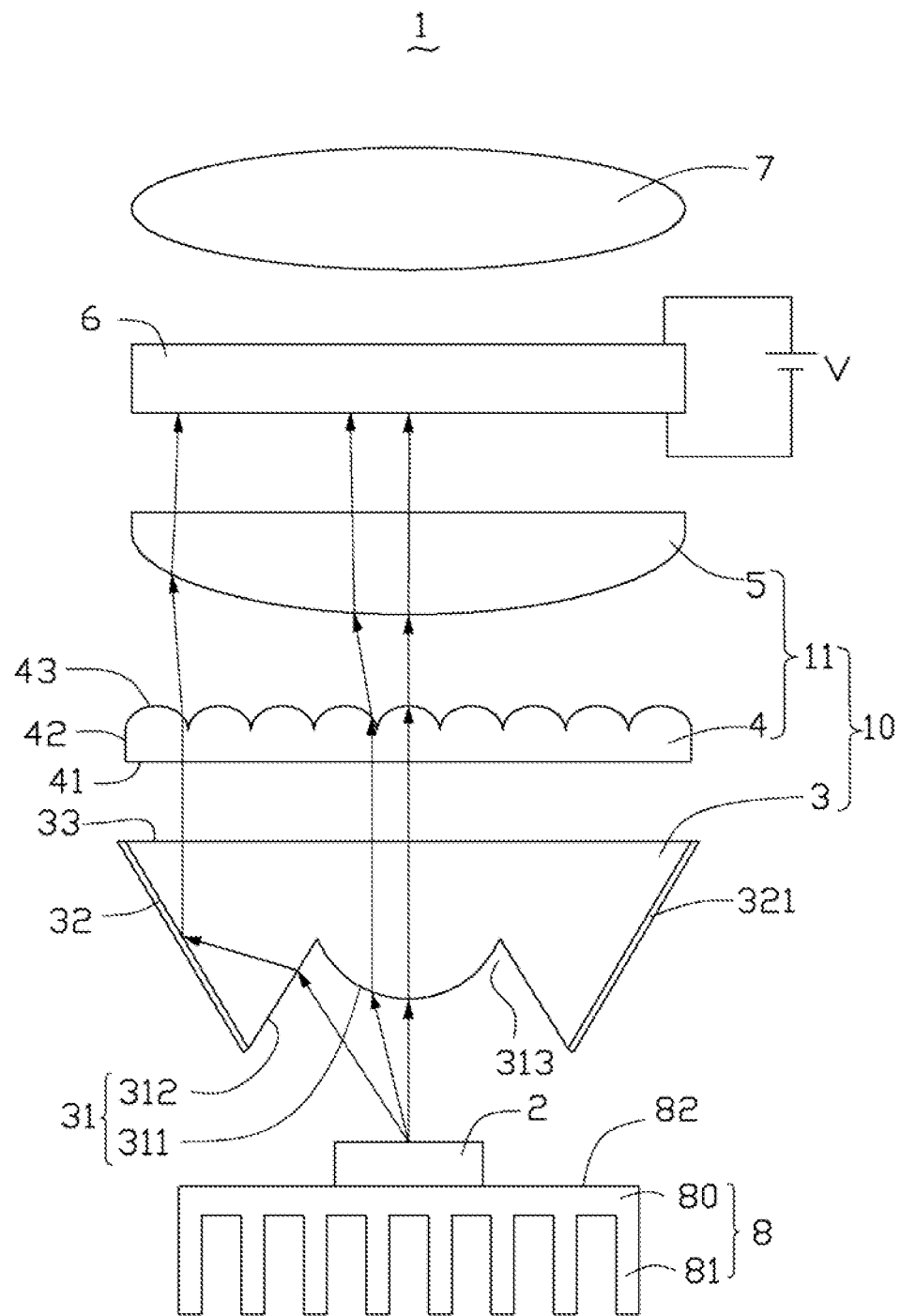
FIG. 1 is a schematic view of an LED vehicle headlamp in accordance with a first embodiment of the present disclosure.

Referring to FIG. 1, an LED vehicle headlamp 1 in accordance with a first embodiment of the present disclosure includes an LED light source 2, an electrochromic device 6 optically coupled to the LED light source 2, a collimator 10 positioned between the LED light source 2 and the electrochromic device 6, and a projection lens 7 located above the electrochromic device 6 to project light out from the LED vehicle headlamp 1.

The LED light source 2 is mounted on a top face 82 of a base 80 of a heat sink 8. The heat sink 8 is adopted for dissipating heat generated by the LED light source 2. The heat sink 8 includes a plurality of fins 81 extending downwardly from a bottom face of the base 80 which is opposite to the top face 82 thereof.

The collimator 10 is positioned between the LED light source 2 and the electrochromic device 6 to collimate and converge light emitted from the LED light source 2 and direct the light uniformly into the electrochromic device 6. In the present embodiment, the collimator 10 includes a collimating lens 3 and a focus lens 11.

The collimating lens 3 of the collimator 10 includes a light incident face 31, a light exit face 33, and a conical surface 32 interconnecting the light incident face 31 and the light exit face 33. The conical surface 32 of the collimating lens 3 has a diameter increasing gradually from the light incident face 31 toward the light exit face 33 thereof. In the present embodiment, the light exit face 33 of the collimating lens 3 is a horizontal plane.

The light emitted from the LED light source 2 enters the collimating lens 3 through the light incident face 31 thereof, and a portion of light refracted at a large angle into the collimating lens 3 is projected onto the conical surface 32 and then reflected by the conical surface 32 toward the light exit face 33. In the present embodiment, a reflective layer 321 is coated on the conical surface 32 of the collimating lens 3 to improve reflection efficiency of the conical surface 32.

The light incident face 31 of the collimating lens 3 is recessed inwardly from a lower edge of the conical surface 32 toward an interior of the collimating lens 3 to form a recess 313. The light incident face 31 includes a first light incident face 311 and a second incident face 312 surrounding the first light incident face 311. The first light incident face 311 is arc-shaped in cross section and located at the bottom of the recess 313 and protrudes outwardly toward the LED light source 2. The second light incident face 312 is conical-shaped. The second light incident face 312 has a diameter decreasing gradually along a bottom-to-top direction of the collimating lens 32. The second light incident face 312 has a lower edge thereof in connection with the conical surface 32 and an upper edge thereof in connection with the first light incident face 311.

The focus lens 11 of the collimator 10 includes a first focus lens 4 and a second focus lens 5. The first focus lens 4 is positioned between the collimating lens 3 and the second focus lens 5. The first focus lens 4 includes a light incident face 41, a light exit face 43 spaced from the light incident face 41, and a connecting face 42 interconnecting the light incident face 41 and the light exit face 43.

The light incident face 41 of the first focus lens 4 is a flat surface. The connecting face 42 of the first focus lens 4 extends upwardly from an outer periphery of the light incident face 41. The light exit face 43 of the first focus lens 4 is waved to form a plurality of peaks with a valley between every two adjacent peaks.

The second focus lens 5 of the focus lens 11 is a plano-convex lens. The convex surface of the second focus lens 5 faces the light exit face 43 of the first focus lens 4. The parallel light beams exiting from the collimating lens 3 firstly pass through the first focus lens 4 to form a plurality of discrete light strip segments, and the light strip segments pass through the second focus lens 5 to form a continuous field of illumination having a uniform density throughout its entire illumination.

Figure 2:
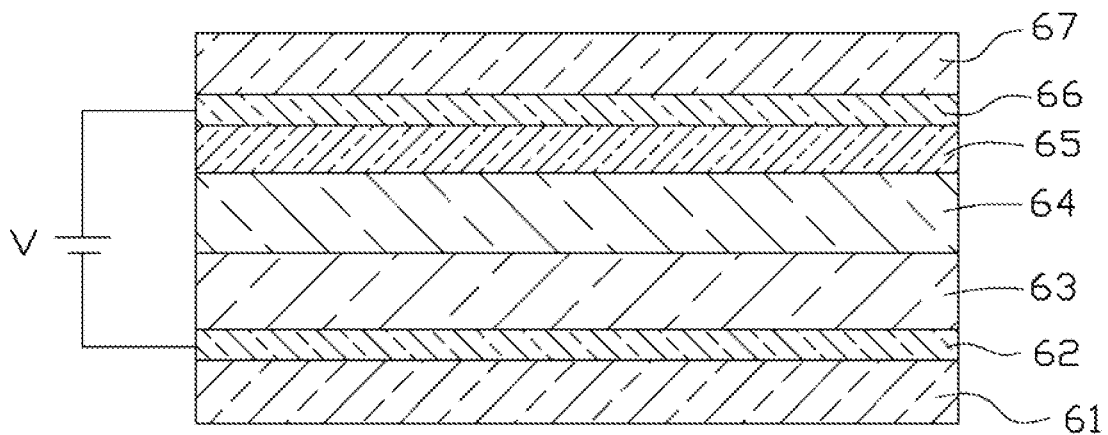
FIG. 2 is a cross-sectional view of an electrochromic device of the LED vehicle headlamp of FIG. 1, together with a voltage source applied thereto.

Referring to FIGS. 1 and 2, the electrochromic device 6 is positioned at or near a focal plane of the focus lens 11 of the collimator 10. The electrochromic device 6 having an alterable light transmission characteristics in response to voltage/current level applied thereto. The electrochromic device 6 includes a first glass substrate 61, a conductive layer 62, an electrochromic layer 63, an ion conducting layer 64, a counter electrode layer 65, a conductive layer 66 and a second glass substrate 67 formed in sequence. The ion conducting layer 64 is sandwiched between the electrochromic layer 63 and the counter electrode layer 65. The ion conducting layer 64 is highly conductive to ions and highly resistive to electrons. That is to say, the ion conducting layer 64 only permits movement of ions therethrough, but blocks electrons.

When a forward bias voltage/current is applied to the electrochromic device 6 as shown in FIG. 2, the visible light transmission of the electrochromic device 6 decreases accordingly to generate a first light intensity distribution pattern. More in details, when a forward bias voltage source V is applied between the conductive layer 62 and 66 of the electrochromic device 6, ions existing in the counter electrode layer 65 are transported across the ion conducting layer 64 into the electrochromic layer 63, thereby causing the electrochromic device 6 to be a colored state in which only a portion of the focused light exiting from the focus lens 11 passes through the electrochromic device 6. Thus, The LED vehicle headlamp 1 having a first light intensity distribution pattern is obtained.

When a backward bias voltage/current is applied to the electrochromic device 6, the visible light transmission of the electrochromic device 6 increases accordingly to generate a second light intensity distribution pattern. More in details, when a backward bias voltage/current is applied between the conductive layer 62 and 66 of the electrochromic device 6, ions existing in the electrochromic layer 63 are transported across the ion conducting layer 64 into the counter electrode layer 65, thereby causing the electrochromic device 6 to be in a bleached state in which most of the focused light exiting from the focus lens 11 pass through the electrochromic device 6. Thus, The LED vehicle headlamp 1 having a second light intensity distribution pattern different from the first light intensity distribution pattern is obtained. In use, The LED vehicle headlamp 1 having a first light intensity distribution is configured for near field illumination (i.e., low beam), while The LED vehicle headlamp 1 having a second light intensity distribution is configured for far field illumination (i.e., high beam).

Figure 3:
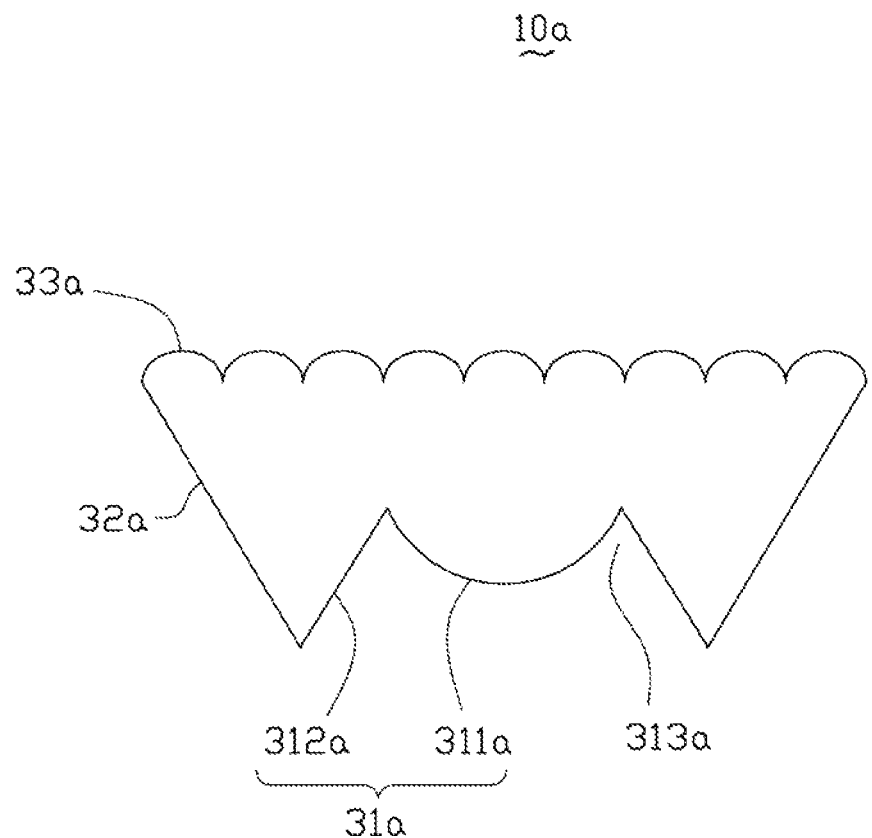
FIG. 3 is a collimator of an LED vehicle headlamp in accordance with a second embodiment of the present disclosure.

Referring to FIG. 3, different from the collimator 10 of the LED vehicle headlamp 1 shown in FIG. 1, a collimator 10a of an LED vehicle headlamp in accordance with a second embodiment is a single-pieced component. The collimator 10a includes a light incident face 31a, a light exit face 33a, and a conical surface 32a interconnecting the light incident face 31a and the light exit face 33a.

The conical surface 32a of the collimator 10a has a diameter increasing gradually from the light incident face 31a toward the light exit face 33a. The light exit face 33a is waved to form a plurality of peaks with a valley between every two adjacent peaks. The light incident face 31a is recessed inwardly from a lower edge of the conical surface 32a toward an interior of the collimator 10a to form a recess 313a. The light incident face 31a includes a first light incident face 311a and a second light incident face 312a surrounding the first light incident face 311a. The first light incident face 311a is arc-shaped in cross section and located at the bottom of the recess 313a and protrudes outwardly toward the LED light source. The second light incident face 312a is conical shaped and has a diameter decreasing gradually from the lower edge toward an upper ledge of the conical surface 32a of the collimator 10a.

Figure 4:
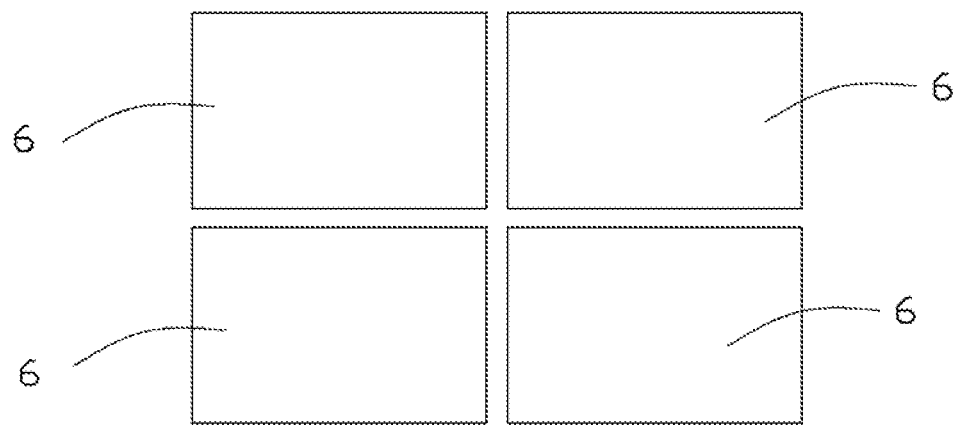
FIG. 4 is a schematic view of an arrangement of four electrochromic devices of an LED vehicle headlamp in accordance with a third embodiment of the present disclosure.
Figure 5:
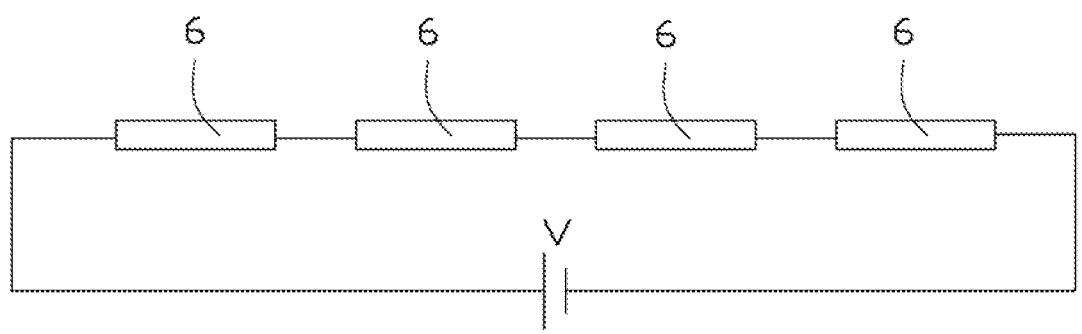
FIG. 5 is a circuit diagram of the electrochromic devices of FIG. 4, and showing the electrochromic devices being electrically connected to each other in series to a voltage source.
Figure 6:
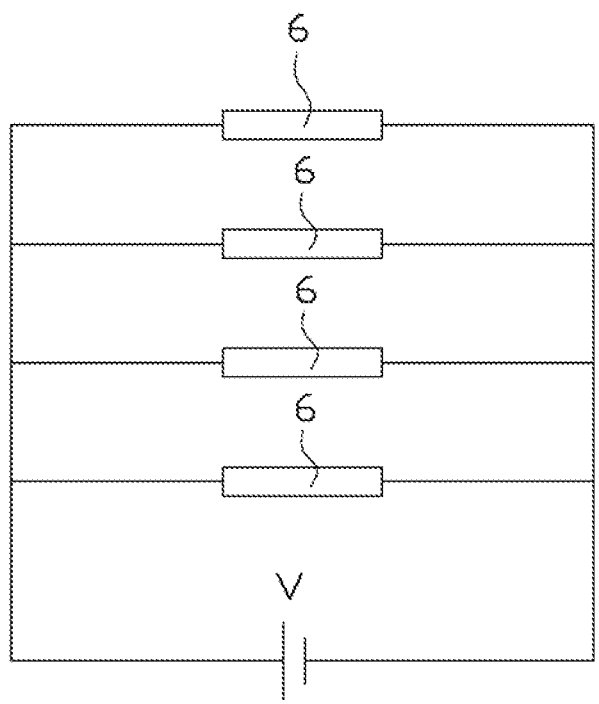
FIG. 6 is similar to FIG. 5, but shows the electrochromic devices being electrically connected to each other in parallel to a voltage source.

Referring to FIGS. 4, 5 and 6, different from the electrochromic device 6 of the LED vehicle headlamp 1 shown in FIG. 1, an LED vehicle headlamp in accordance with a third embodiment has four electrochromic devices 6. The electrochromic devices 6 are electrically connected to each other and arranged in a square array 60. In more details, the electrochromic devices 6 are electrically connected to each other in series or parallel. Furthermore, each electrochromic device 6 in the square array 60 could be individually manipulated by the driver so as to create various light intensity distribution patterns in a predetermined region. Alternatively, the number/arrangement of the electrochromic devices 6 could be changed according to the actual requirements of light intensity distribution.

In the present disclosure, a visible light transmission of the electrochromic device 6 of the LED vehicle headlamp 1 is adjustable according to the voltage/current applied thereto, so the light intensity distribution of The LED vehicle headlamp 1 could be easily adjusted by the manufactures, thereby effectively improving the adaption of the LED vehicle headlamp 1 to different countries without the necessity of a costly modification to the structure of the LED vehicle headlamp 1.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A light emitting diode (LED) vehicle headlamp comprising:
   an LED light source;
   at least one electrochromic device optically coupled to the LED light source, and the at least one electrochromic device having an alterable light transmission characteristics in response to voltage/current level applied thereto; and
   a collimator positioned between the LED light source and the at least one electrochromic device to collimate and converge light emitted from the LED light source and direct light into the at least one electrochromic device;
   wherein when a forward bias voltage/current is applied to the at least one electrochromic device, the visible light transmission of the at least one electrochromic device decreases accordingly to generate a first light intensity distribution pattern, and when a backward bias voltage/current is applied to the at least one electrochromic device, the visible light transmission of the at least one electrochromic device increases accordingly to generate a second light intensity distribution pattern different from the first light intensity distribution pattern.

2. The LED vehicle headlamp of claim 1, wherein the collimator comprises a light incident face, a light exit face, and a conical surface interconnecting the light incident face and the light exit face.

3. The LED vehicle headlamp of claim 2, wherein the conical surface of the collimator has a diameter increasing gradually from the light incident face toward the light exit face of the collimator.

4. The LED vehicle headlamp of claim 3, wherein the light exit face of the collimator is waved to form a plurality of peaks with a valley between every two adjacent peaks, and the light incident face of the collimator is recessed inwardly from a lower edge of the conical surface toward an interior of the collimator.

5. The LED vehicle headlamp of claim 4, wherein the light incident face of the collimator comprises a first light incident face and a second light incident face surrounding the first light incident face, and the first light incident face of the collimator is arc-shaped in cross section and protrudes outwardly toward the LED light source.

6. The LED vehicle headlamp of claim 5, wherein the second light incident face of the collimator is conical, and the second light incident face has a diameter decreasing gradually from a lower edge toward an upper edge of the conical surface of the collimator.

7. The LED vehicle headlamp of claim 1, wherein the collimator comprises a collimating lens and a focus lens.

8. The LED vehicle headlamp of claim 7, wherein the collimating lens of the collimator comprises a light incident face, a light exit face, and a conical surface interconnecting the light incident face and the light exit face.

9. The LED vehicle headlamp of claim 8, wherein the conical surface of the collimating lens has a diameter increasing gradually from the light incident face toward the light exit face of the collimating lens.

10. The LED vehicle headlamp of claim 9, wherein a reflective layer is coated on the conical surface of the collimating lens.

11. The LED vehicle headlamp of claim 9, wherein the light exit face of the collimating lens is a flat surface, and the light incident face of the collimating lens is recessed inwardly from a lower edge of the conical surface toward an interior of the collimating lens.

12. The LED vehicle headlamp of claim 11, wherein the light incident face of the collimating lens comprises a first light incident face and a second light incident face surrounding the first light incident face, and the first light incident face of the collimating lens is arc-shaped in cross section and protrudes outwardly toward the LED light source.

13. The LED vehicle headlamp of claim 7, wherein the at least one electrochromic device is positioned at or near a focal plane of the focus lens of the collimator.

14. The LED vehicle headlamp of claim 7, wherein the focus lens of the collimator comprises a first focus lens and a second focus lens, and the first focus lens is positioned between the second focus lens and the collimating lens.

15. The LED vehicle headlamp of claim 14, wherein the first focus lens comprises a light incident face, a light exit face spaced from the light incident face and a connecting face interconnecting the light incident face and the light exit face, the light incident face of the first focus lens is a horizontal plane, and the light exit face of the first focus lens is waved to form a plurality of peaks with a valley between every two adjacent peaks.

16. The LED vehicle headlamp of claim 1, wherein the at least one electrochromic device comprises a conductive layer, an electrochromic layer, an ion conducting layer, a counter electrode layer and a conductive layer formed in sequence.

17. The LED vehicle headlamp of claim 16, wherein the at least one electrochromic device comprises four electrochromic devices, and the four electrochromic devices are electrically connected to each other and arranged in a square array.

18. The LED vehicle headlamp of claim 17, wherein the electrochromic devices are electrically connected to each other in series or parallel.

19. The LED vehicle headlamp of claim 1, further comprising a projection lens located above the electrochromic device to project light out from The LED vehicle headlamp.

20. The LED vehicle headlamp of claim 1, further comprising a heat sink for dissipating heat generated from the LED light source, wherein the LED light source is mounted on a top face of the heat sink.

* * * * *